United States Patent
Jones

(10) Patent No.: US 7,506,842 B2
(45) Date of Patent: *Mar. 24, 2009

(54) AIRCRAFT CONTROL SURFACE DRIVE SYSTEM AND ASSOCIATED METHODS

(75) Inventor: Kelly T. Jones, Snohomish, WA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/959,629

(22) Filed: Oct. 5, 2004

(65) Prior Publication Data

US 2005/0109876 A1 May 26, 2005

Related U.S. Application Data

(62) Division of application No. 10/720,786, filed on Nov. 24, 2003, now Pat. No. 6,799,739.

(51) Int. Cl.
*B64C 13/40* (2006.01)
(52) U.S. Cl. ..................................... 244/226
(58) Field of Classification Search ............... 244/78.1, 244/226, 211–213
See application file for complete search history.

(56) References Cited

U.S. PATENT DOCUMENTS

| | | | |
|---|---|---|---|
| 1,724,456 A | 8/1929 | Crook | |
| 1,770,575 A | 7/1930 | Ksoll | |
| 2,086,085 A | 7/1937 | Lachmann et al. | |
| 2,138,952 A | 12/1938 | Blume | |
| 2,169,416 A | 8/1939 | Griswold | |
| 2,282,516 A | 5/1942 | Hans et al. | |

(Continued)

FOREIGN PATENT DOCUMENTS

DE 387 833 1/1924

(Continued)

OTHER PUBLICATIONS

"Line", Answers.com, http://www.answers.com/line&r=67.*

(Continued)

*Primary Examiner*—Tien Dinh
(74) *Attorney, Agent, or Firm*—Perkins Coie LLP

(57) ABSTRACT

A control surface drive system having a plurality of actuator assemblies are coupled to first and second supply lines and to a return line. The first and second supply lines are connected to a source of hydraulic fluid. At least one of the actuator assemblies has a hydraulic actuator movably connectable to an aircraft control surface. A flow control assembly is connected to the return line and to at least one of the first and second supply lines. A bypass line is in fluid communication with the first and second supply lines and positioned to recycle the hydraulic fluid from one of the first and second supply lines back into the other one of the first and second supply lines when the hydraulic actuator moves toward the first position. A computer controller operatively interconnects the plurality of actuator assemblies and the flow control assembly. It is emphasized that this abstract is provided to comply with the rules requiring an abstract. It is submitted with the understanding that it will not be used to interpret or limit the scope or meaning of the claims(37 C.F.R. § 1.72(b)).

7 Claims, 4 Drawing Sheets

U.S. PATENT DOCUMENTS

| | | | |
|---|---|---|---|
| 2,289,704 A | 7/1942 | Grant | |
| 2,319,383 A | 5/1943 | Zap | |
| 2,347,230 A | 4/1944 | Zuck | |
| 2,358,985 A | 9/1944 | McAndrew | |
| 2,378,528 A | 6/1945 | Arsandaux | |
| 2,383,102 A | 8/1945 | Zap | |
| 2,385,351 A * | 9/1945 | Davidsen | 244/223 |
| 2,387,492 A | 10/1945 | Blaylock et al. | |
| 2,389,274 A * | 11/1945 | Pearsall, Jr. et al. | 91/372 |
| 2,406,475 A | 8/1946 | Rogers | |
| 2,422,196 A | 6/1947 | Flader et al. | |
| 2,422,296 A | 6/1947 | Flader et al. | |
| 2,444,293 A | 6/1948 | Holt | |
| 2,458,900 A | 1/1949 | Erny | |
| 2,504,684 A | 4/1950 | Harper | |
| 2,518,854 A | 8/1950 | Badenoch | |
| 2,555,862 A | 6/1951 | Romani | |
| 2,563,453 A | 8/1951 | Briend | |
| 2,652,812 A | 9/1953 | Fenzl | |
| 2,665,084 A | 1/1954 | Feeney et al. | |
| 2,665,085 A | 1/1954 | Feeney et al. | |
| 2,702,676 A | 2/1955 | Delaney, Jr. | |
| 2,743,887 A | 5/1956 | Fiedler | |
| 2,851,229 A | 9/1958 | Clark | |
| 2,864,239 A | 12/1958 | Taylor | |
| 2,877,968 A * | 3/1959 | Granan et al. | 244/78.1 |
| 2,886,008 A | 5/1959 | Geyer et al. | |
| 2,891,740 A | 6/1959 | Campbell | |
| 2,892,312 A | 6/1959 | Allen et al. | |
| 2,899,152 A * | 8/1959 | Weiland | 244/226 |
| 2,912,190 A | 11/1959 | MacDonough | |
| 2,920,844 A | 1/1960 | Marshall et al. | |
| 2,938,680 A | 5/1960 | Greene et al. | |
| 2,990,144 A | 6/1961 | Hougland | |
| 2,990,145 A | 6/1961 | Hougland | |
| 3,013,748 A | 12/1961 | Westburg | |
| 3,089,666 A | 5/1963 | Quenzler | |
| 3,102,607 A | 9/1963 | Roberts | |
| 3,112,089 A | 11/1963 | Dornier | |
| 3,136,504 A | 6/1964 | Carr | |
| 3,166,271 A | 1/1965 | Zuck | |
| 3,191,147 A | 6/1965 | Majendie | |
| 3,203,275 A | 8/1965 | Hoover | |
| 3,203,647 A | 8/1965 | Alvarez-Calderon | |
| 3,263,946 A | 8/1966 | Roberts et al. | |
| 3,282,535 A | 11/1966 | Steiner | |
| 3,375,998 A | 4/1968 | Alvarez-Calderon | |
| 3,423,858 A * | 1/1969 | Speno | 37/106 |
| 3,447,763 A | 6/1969 | Allcock | |
| 3,463,418 A | 8/1969 | Miksch | |
| 3,486,720 A | 12/1969 | Seglem et al. | |
| 3,499,622 A | 3/1970 | Lugan et al. | |
| 3,504,870 A | 4/1970 | Cole et al. | |
| 3,528,632 A | 9/1970 | Miles et al. | |
| 3,539,133 A | 11/1970 | Robertson | |
| 3,556,439 A | 1/1971 | Autry et al. | |
| 3,587,311 A | 6/1971 | Hays, Jr. | |
| 3,589,648 A | 6/1971 | Gorham et al. | |
| 3,642,234 A | 2/1972 | Kamber et al. | |
| 3,653,611 A | 4/1972 | Trupp et al. | |
| 3,659,810 A | 5/1972 | Robertson | |
| 3,677,504 A | 7/1972 | Schwarzler | |
| 3,704,743 A | 12/1972 | Edwards | |
| 3,704,828 A | 12/1972 | Studer et al. | |
| 3,704,843 A | 12/1972 | Jenny | |
| 3,711,039 A | 1/1973 | James | |
| 3,730,459 A | 5/1973 | Zuck | |
| 3,743,219 A | 7/1973 | Gorges | |
| 3,767,140 A | 10/1973 | Johnson | |
| 3,776,491 A | 12/1973 | Oulton | |
| 3,794,276 A | 2/1974 | Maltby et al. | |
| 3,804,267 A * | 4/1974 | Cook et al. | 414/795.9 |
| 3,807,447 A * | 4/1974 | Masuda | 137/596.13 |
| 3,813,062 A | 5/1974 | Prather | |
| 3,827,658 A | 8/1974 | Hallworth | |
| 3,831,886 A | 8/1974 | Burdges et al. | |
| 3,836,099 A | 9/1974 | O'Neill et al. | |
| 3,837,601 A | 9/1974 | Cole | |
| 3,847,369 A | 11/1974 | Phillips et al. | |
| 3,862,730 A * | 1/1975 | Heiney | 244/223 |
| 3,874,617 A | 4/1975 | Johnson | |
| 3,897,029 A | 7/1975 | Calderon | |
| 3,904,152 A | 9/1975 | Hill | |
| 3,910,530 A | 10/1975 | James et al. | |
| 3,913,450 A * | 10/1975 | MacGregor | 91/390 |
| 3,917,192 A | 11/1975 | Alvarez-Calderon | |
| 3,931,374 A | 1/1976 | Moutet nee Layrisse et al. | |
| 3,941,334 A | 3/1976 | Cole | |
| 3,941,341 A | 3/1976 | Brogdon, Jr. | |
| 3,949,957 A | 4/1976 | Portier et al. | |
| 3,968,946 A | 7/1976 | Cole | |
| 3,985,319 A | 10/1976 | Dean et al. | |
| 3,987,983 A | 10/1976 | Cole | |
| 3,991,574 A * | 11/1976 | Frazier | 60/645 |
| 3,992,979 A | 11/1976 | Smith | |
| 3,993,584 A | 11/1976 | Owen et al. | |
| 3,994,451 A | 11/1976 | Cole | |
| 4,011,888 A * | 3/1977 | Whelchel et al. | 137/879 |
| 4,015,787 A | 4/1977 | Maieli et al. | |
| 4,049,219 A | 9/1977 | Dean et al. | |
| 4,106,730 A | 8/1978 | Spitzer et al. | |
| 4,117,996 A | 10/1978 | Sherman | |
| 4,120,470 A | 10/1978 | Whitener | |
| 4,131,253 A | 12/1978 | Zapel | |
| 4,146,200 A | 3/1979 | Borzachillo | |
| 4,171,787 A | 10/1979 | Zapel | |
| 4,180,222 A | 12/1979 | Thornburg | |
| 4,181,275 A | 1/1980 | Moelter et al. | |
| 4,189,120 A | 2/1980 | Wang | |
| 4,189,121 A | 2/1980 | Harper et al. | |
| 4,189,122 A | 2/1980 | Miller | |
| 4,200,253 A | 4/1980 | Rowarth | |
| 4,202,519 A | 5/1980 | Fletcher | |
| 4,240,255 A | 12/1980 | Benilan | |
| 4,247,843 A | 1/1981 | Miller | |
| 4,262,868 A | 4/1981 | Dean | |
| 4,267,990 A | 5/1981 | Staudacher et al. | |
| 4,275,942 A | 6/1981 | Steidl | |
| 4,283,029 A | 8/1981 | Rudolph | |
| 4,285,482 A | 8/1981 | Lewis | |
| 4,293,110 A | 10/1981 | Middleton | |
| 4,312,486 A | 1/1982 | Mc Kinney | |
| 4,325,123 A | 4/1982 | Graham | |
| 4,351,502 A | 9/1982 | Statkus | |
| 4,353,517 A | 10/1982 | Rudolph | |
| 4,358,077 A | 11/1982 | Coronel | |
| 4,360,176 A | 11/1982 | Brown | |
| 4,363,098 A | 12/1982 | Buus et al. | |
| 4,365,774 A | 12/1982 | Coronel | |
| 4,368,937 A | 1/1983 | Palombo | |
| 4,384,693 A | 5/1983 | Pauly et al. | |
| 4,427,168 A | 1/1984 | Mc Kinney | |
| 4,441,675 A | 4/1984 | Boehringer | |
| 4,444,368 A | 4/1984 | Andrews | |
| 4,448,375 A | 5/1984 | Herndon | |
| 4,459,084 A * | 7/1984 | Clark | 417/11 |
| 4,461,449 A | 7/1984 | Turner | |
| 4,471,925 A | 9/1984 | Kunz et al. | |
| 4,471,927 A | 9/1984 | Rudolph | |
| 4,472,780 A | 9/1984 | Chenoweth et al. | |
| 4,475,702 A | 10/1984 | Cole | |
| 4,479,620 A | 10/1984 | Rogers et al. | |
| 4,485,992 A | 12/1984 | Rao | |
| 4,496,121 A | 1/1985 | Berlin | |

| Patent | Type | Date | Inventor | Ref |
|---|---|---|---|---|
| 4,498,646 | A | 2/1985 | Proksch | |
| 4,528,775 | A | 7/1985 | Einarsson | |
| 4,533,096 | A | 8/1985 | Baker et al. | |
| 4,542,869 | A | 9/1985 | Brine | |
| 4,544,117 | A | 10/1985 | Schuster | |
| 4,553,722 | A | 11/1985 | Cole | |
| 4,575,030 | A | 3/1986 | Gratzer | |
| 4,575,099 | A | 3/1986 | Nash | |
| 4,576,347 | A | 3/1986 | Opsahl | |
| 4,605,187 | A | 8/1986 | Stephenson | |
| 4,618,109 | A | 10/1986 | Victor | |
| 4,637,573 | A | 1/1987 | Perin et al. | |
| 4,650,140 | A | 3/1987 | Cole | |
| 4,691,879 | A | 9/1987 | Greene | |
| 4,700,911 | A | 10/1987 | Zimmer | |
| 4,702,441 | A | 10/1987 | Wang | |
| 4,702,442 | A | 10/1987 | Weiland et al. | |
| 4,706,913 | A | 11/1987 | Cole | |
| 4,712,752 | A | 12/1987 | Victor | |
| 4,717,097 | A | 1/1988 | Sepstrup | |
| 4,720,066 | A | 1/1988 | Renken et al. | |
| 4,729,528 | A | 3/1988 | Borzachillo | |
| 4,747,375 | A | 5/1988 | Williams | |
| 4,779,822 | A | 10/1988 | Burandt et al. | |
| 4,784,355 | A | 11/1988 | Brine | |
| 4,786,013 | A | 11/1988 | Pohl | |
| 4,789,119 | A * | 12/1988 | Bellego et al. | 244/226 |
| 4,796,192 | A | 1/1989 | Lewis | |
| 4,823,836 | A | 4/1989 | Bachmann et al. | |
| 4,834,319 | A | 5/1989 | Ewy et al. | |
| 4,838,503 | A | 6/1989 | Williams et al. | |
| 4,854,528 | A | 8/1989 | Hofrichter et al. | |
| 4,856,735 | A | 8/1989 | Lotz | |
| 4,860,007 | A | 8/1989 | Konicke | |
| 4,867,394 | A | 9/1989 | Patterson, Jr. | |
| 4,892,274 | A | 1/1990 | Pohl et al. | |
| 4,899,284 | A | 2/1990 | Lewis et al. | |
| 4,962,902 | A | 10/1990 | Fortes | |
| 5,039,032 | A | 8/1991 | Rudolph | |
| 5,046,688 | A | 9/1991 | Woods | |
| 5,050,081 | A | 9/1991 | Abbott et al. | |
| 5,056,741 | A | 10/1991 | Bliesner et al. | |
| 5,074,495 | A | 12/1991 | Raymond | |
| 5,082,207 | A | 1/1992 | Tulinius | |
| 5,082,208 | A | 1/1992 | Matich | |
| 5,088,665 | A | 2/1992 | Vijgen | |
| 5,094,411 | A | 3/1992 | Rao | |
| 5,094,412 | A | 3/1992 | Narramore | |
| 5,098,043 | A | 3/1992 | Arena | |
| 5,100,082 | A | 3/1992 | Archung | |
| 5,114,100 | A | 5/1992 | Rudolph | |
| 5,129,597 | A | 7/1992 | Manthey | |
| 5,158,252 | A | 10/1992 | Sakurai | |
| 5,167,383 | A | 12/1992 | Nozaki | |
| 5,203,619 | A | 4/1993 | Welsch | |
| 5,207,400 | A | 5/1993 | Jennings | |
| 5,222,692 | A | 6/1993 | Glowacki et al. | |
| 5,244,269 | A | 9/1993 | Harriehausen | |
| 5,259,293 | A | 11/1993 | Brunner | |
| 5,280,863 | A | 1/1994 | Schmittle | |
| 5,282,591 | A | 2/1994 | Walters et al. | |
| 5,310,387 | A | 5/1994 | Savagian | |
| 5,351,914 | A | 10/1994 | Nagao | |
| 5,388,788 | A | 2/1995 | Rudolph | |
| 5,420,582 | A | 5/1995 | Kubbat | |
| 5,441,218 | A | 8/1995 | Mueller | |
| 5,474,265 | A | 12/1995 | Capbern | |
| 5,493,497 | A * | 2/1996 | Buus | 701/4 |
| 5,535,852 | A | 7/1996 | Bishop | |
| 5,542,684 | A | 8/1996 | Squirrell | |
| 5,544,847 | A | 8/1996 | Bliesner | |
| 5,564,655 | A | 10/1996 | Garland et al. | |
| 5,600,220 | A * | 2/1997 | Thoraval et al. | 318/562 |
| 5,609,020 | A * | 3/1997 | Jackson et al. | 60/226.2 |
| 5,628,477 | A | 5/1997 | Caferro et al. | |
| 5,680,124 | A | 10/1997 | Bedell | |
| 5,681,014 | A | 10/1997 | Palmer | |
| 5,686,907 | A | 11/1997 | Bedell | |
| 5,711,496 | A | 1/1998 | Nusbaum | |
| 5,715,163 | A | 2/1998 | Bang | |
| 5,735,485 | A | 4/1998 | Ciprian et al. | |
| 5,740,991 | A | 4/1998 | Gleine et al. | |
| 5,746,490 | A | 5/1998 | Domenig | |
| 5,788,190 | A | 8/1998 | Siers | |
| 5,836,550 | A | 11/1998 | Paez | |
| 5,839,698 | A | 11/1998 | Moppert | |
| 5,875,998 | A | 3/1999 | Gleine | |
| 5,915,653 | A | 6/1999 | Koppelman | |
| 5,921,506 | A | 7/1999 | Appa | |
| 5,927,656 | A | 7/1999 | Hinkleman | |
| 5,934,615 | A | 8/1999 | Treichler | |
| 5,978,715 | A | 11/1999 | Briffe | |
| 5,984,230 | A | 11/1999 | Drazi | |
| 6,015,117 | A | 1/2000 | Broadbent | |
| 6,033,180 | A | 3/2000 | Machida et al. | |
| 6,045,204 | A | 4/2000 | Frazier | |
| 6,057,786 | A | 5/2000 | Briffe | |
| 6,073,624 | A | 6/2000 | Laurent | |
| 6,076,767 | A * | 6/2000 | Farley et al. | 244/78.1 |
| 6,076,776 | A | 6/2000 | Breitbach | |
| 6,079,672 | A | 6/2000 | Lam et al. | |
| 6,082,679 | A | 7/2000 | Crouch et al. | |
| 6,085,129 | A | 7/2000 | Schardt | |
| 6,109,567 | A | 8/2000 | Munoz | |
| 6,112,141 | A | 8/2000 | Briffe | |
| 6,145,791 | A | 11/2000 | Diller et al. | |
| 6,152,405 | A | 11/2000 | Muller et al. | |
| 6,161,801 | A | 12/2000 | Kelm | |
| 6,164,598 | A | 12/2000 | Young et al. | |
| 6,173,924 | B1 | 1/2001 | Young et al. | |
| 6,188,937 | B1 | 2/2001 | Sherry | |
| 6,189,837 | B1 * | 2/2001 | Matthews | 244/213 |
| 6,213,433 | B1 | 4/2001 | Gruensfelder | |
| 6,227,498 | B1 | 5/2001 | Arata | |
| 6,244,542 | B1 | 6/2001 | Young et al. | |
| 6,293,497 | B1 | 9/2001 | Kelley-Wickemeyer | |
| 6,328,265 | B1 | 12/2001 | Dizdarevic | |
| 6,349,798 | B1 | 2/2002 | McKay | |
| 6,364,254 | B1 | 4/2002 | May | |
| 6,375,126 | B1 | 4/2002 | Sakurai | |
| 6,382,566 | B1 | 5/2002 | Ferrel et al. | |
| 6,389,333 | B1 | 5/2002 | Hansman | |
| 6,431,498 | B1 | 8/2002 | Watts et al. | |
| 6,439,512 | B1 * | 8/2002 | Hart | 244/178 |
| 6,443,394 | B1 | 9/2002 | Weisend | |
| 6,450,457 | B1 | 9/2002 | Sharp | |
| 6,464,175 | B2 | 10/2002 | Yada et al. | |
| 6,466,141 | B1 | 10/2002 | McKay et al. | |
| 6,478,541 | B1 | 11/2002 | Charles et al. | |
| 6,481,667 | B1 | 11/2002 | Ho | |
| 6,484,969 | B2 | 11/2002 | Sprenger | |
| 6,499,577 | B2 | 12/2002 | Kitamoto et al. | |
| 6,513,761 | B2 | 2/2003 | Huenecke et al. | |
| 6,536,714 | B2 | 3/2003 | Gleine | |
| 6,547,183 | B2 | 4/2003 | Farnsworth | |
| 6,554,229 | B1 | 4/2003 | Lam | |
| 6,561,463 | B1 | 5/2003 | Yount et al. | |
| 6,591,169 | B2 | 7/2003 | Jones et al. | |
| 6,598,829 | B2 | 7/2003 | Kamstra | |
| 6,598,834 | B2 | 7/2003 | Nettle et al. | |
| 6,601,801 | B1 | 8/2003 | Prow | |
| 6,622,972 | B2 | 9/2003 | Urnes | |
| 6,622,974 | B2 | 9/2003 | Dockter et al. | |
| 6,625,982 | B2 * | 9/2003 | Van Den Bossche et al. | 60/403 |
| 6,644,599 | B2 | 11/2003 | Perez | |
| 6,651,930 | B1 * | 11/2003 | Gautier et al. | 244/78.1 |

| | | | |
|---|---|---|---|
| 6,729,583 B2 | 5/2004 | Milliere et al. | |
| 6,745,113 B2 | 6/2004 | Griffin, III et al. | |
| 6,755,375 B2 | 6/2004 | Trikha | |
| 6,796,526 B2* | 9/2004 | Boehringer | 244/78.1 |
| 6,796,534 B2 | 9/2004 | Beyer et al. | |
| 6,799,739 B1* | 10/2004 | Jones | 244/10 |
| 6,802,475 B2 | 10/2004 | Davies et al. | |
| 6,824,099 B1 | 11/2004 | Jones | |
| 6,843,452 B1 | 1/2005 | Vassberg et al. | |
| 6,860,452 B2 | 3/2005 | Bacon et al. | |
| 6,870,490 B2 | 3/2005 | Sherry et al. | |
| 6,910,659 B2 | 6/2005 | Friddell et al. | |
| 7,007,889 B2 | 3/2006 | Charron | |
| 7,028,948 B2 | 4/2006 | Pitt | |
| 7,048,234 B2 | 5/2006 | Recksiek et al. | |
| 7,051,975 B2 | 5/2006 | Pohl et al. | |
| 7,051,982 B1 | 5/2006 | Johnson | |
| 7,226,020 B2 | 6/2007 | Pohl et al. | |
| 2001/0006207 A1 | 7/2001 | Caton et al. | |
| 2002/0046087 A1 | 4/2002 | Hey | |
| 2002/0100842 A1 | 8/2002 | Perez | |
| 2002/0184885 A1* | 12/2002 | Blot-Carretero et al. | 60/776 |
| 2003/0058134 A1 | 3/2003 | Sherry | |
| 2003/0132860 A1 | 7/2003 | Feyereisen | |
| 2003/0197097 A1 | 10/2003 | Wakayama | |
| 2003/0230677 A1 | 12/2003 | Milliere | |
| 2004/0004162 A1 | 1/2004 | Beyer | |
| 2004/0016556 A1* | 1/2004 | Barber | 172/452 |
| 2004/0059474 A1 | 3/2004 | Boorman | |
| 2004/0075020 A1 | 4/2004 | Trikha | |
| 2004/0195464 A1 | 10/2004 | Vassberg et al. | |
| 2004/0217575 A1* | 11/2004 | Beaujot et al. | 280/442 |
| 2005/0011994 A1 | 1/2005 | Sakurai et al. | |
| 2005/0017126 A1 | 1/2005 | McLean et al. | |
| 2005/0045765 A1 | 3/2005 | Pitt | |
| 2005/0109876 A1 | 5/2005 | Speer | |
| 2005/0242234 A1 | 11/2005 | Mahmulyin | |
| 2006/0038086 A1 | 2/2006 | Reckzeh | |
| 2006/0145028 A1 | 7/2006 | Richter et al. | |
| 2006/0169487 A1 | 8/2006 | Konings | |
| 2006/0175468 A1 | 8/2006 | Huynh et al. | |
| 2006/0226297 A1 | 10/2006 | Perez-Sanchez | |
| 2006/0245882 A1* | 11/2006 | Khan et al. | 414/525.5 |
| 2006/0261217 A1 | 11/2006 | Voogt | |
| 2007/0034748 A1 | 2/2007 | Sakurai et al. | |
| 2007/0114328 A1 | 5/2007 | Lacy et al. | |
| 2007/0114329 A1 | 5/2007 | Lacy et al. | |
| 2007/0176051 A1 | 8/2007 | Good et al. | |
| 2007/0252040 A1 | 11/2007 | Kordel et al. | |

FOREIGN PATENT DOCUMENTS

| | | |
|---|---|---|
| DE | 11 29 379 | 5/1962 |
| EP | 0100775 A1 | 2/1984 |
| EP | 0 103 038 | 3/1984 |
| EP | 0215211 | 3/1987 |
| EP | 0 370 640 | 5/1990 |
| EP | 0 483 504 A1 | 5/1992 |
| EP | 0 489 521 | 6/1992 |
| EP | 0 781 704 | 7/1997 |
| EP | 0 947 421 | 10/1999 |
| EP | 1 010 616 A2 | 6/2000 |
| EP | 1010616 | 6/2000 |
| EP | 1338506 | 8/2003 |
| EP | 1462361 | 9/2004 |
| EP | 1 547 917 A1 | 6/2005 |
| FR | 705155 | 6/1931 |
| FR | 984 443 | 7/1951 |
| FR | 56 121 | 9/1952 |
| FR | 57 988 | 9/1953 |
| FR | 58 273 | 11/1953 |
| GB | 886136 | 1/1962 |
| GB | 1 181 991 | 2/1970 |
| GB | 2 144 688 A | 3/1985 |
| WO | WO-02/24530 | 3/2002 |

OTHER PUBLICATIONS

"Pipe", Answers.com, http://www.answers.com/pipe%20.*
"Bypass", Answers.com, http://www.answers.com/bypass&r=67.*
U.S. Appl. No. 10/671,435, Kelley-Wickemyer.
U.S. Appl. No. 10/770,256, Speer.
U.S. Appl. No. 10/789,100, Lacy.
U.S. Appl. No. 10/868,234, Rampton.
U.S. Appl. No. 10/868,238, Dun.
U.S. Appl. No. 10/935,846, Good et al.
U.S. Appl. No. 10/955,686, Wheaton et al.
Drela, M., "Optimization Techniques In Airfoil Design," MIT Aero & Astro, 29 pages.
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
Hansen, H., "Application of Mini-Trailing-Edge Devices in the Awiator Project," Airbus Deutschland, EGAG, Hunefeldstr. 1-5, D-28199 Bremen, Germany, 9 pages.
Junkers JU 52/3M (2 pages); http://www.wpafb.af.mil/museum/outdoor/od16[Accessed Aug. 7, 2003].
Petrov, A.V., "Certain Types of Separated Flow over Slotted Wings," Fluid Mechanics—Soviet Research, vol. 7, No. 5, Sep.-Oct. 1978.
The High Speed Frontier, Chapter 2: The High-Speed Airfoil Program, "Supercritical" Airfoils, 1957-1978 (4 pages); http://www.hq.nasa.gov/office/pao/History/SP-445/ch2-5.
TU 1-44 Canard, 1 pg, date unknown.
Whitcomb, Richard T., "Review of NASA Supercritical Airfoils," National Aeornautics and Space Administration, Aug. 1974 (pp. 8-18).
U.S. Appl. No. 10/746,883, Boorman.
U.S. Appl. No. 10/746,912, Boorman.
U.S. Appl. No. 10/787,644, Tafs et al.
U.S. Appl. No. 10/798,749, Sandell et al.
U.S. Appl. No. 10/814,369, Chen et al.
U.S. Appl. No. 10/814,494, Gunn et al.
U.S. Appl. No. 10/815,034, Crane et al.
Boeing, 777 Aircraft Maintenance Manual, Sep. 5, 2002 (p. 39).
European Search Report for European Patent Application No. EP 03 07 7840, The Boeing Company, Nov. 4, 2003 (2 pgs).
International Search Report, PCT/US03/19724/ Sep. 11, 2003, 5 pages.
MOOG, Component Maintenance Manual, May 1994 (2 pages).
Niu, Chen-Yen, Airframe Structural Design, Chen-Yeun Niu, Conmilit Press, 1988 (1 page).
U.S. Appl. No. 10/454,417, Neal V. Huynh.
U.S. Appl. No. 60/475,828, Kevin W. Beyer.
Airframe Structural Design, Chen-Yeun Niu, Conmilit Press, 1988 (1 page).
777 High Lift System, 777 Maintenance Manual, Publication Date: Circa 1994 (1 page).
A340 Flight Controls, SAE Presentation, Publication Date: Circa 1995 (1 page).
Flap Transmission and Support, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
777 Transmission—Typical, 777 Maintenance Manual, Publication Date: Circa 1994 (1 page).
Flap Drive System, 777 Maintenance Manual, Publication Date: Circa 1994 (1 page).
"Adaptive Aircraft: No Flight of Fancy?" Research into using exotic means of making wings change shpe in-flight looks promising, though still a long way from reality, Business Week Online, Jan. 7, 2003, pp. 1-3.
"Aero-Space Research & Technology," Space Systems, Sep. 1, 2001, pp. 1-28.
"Morphing aircraft Structure,"—Penn State University, www.personal.psu.edu/users/d/s/dsr134/mas/Cellular.htm, pp. 1-3.

"Morphing Aircraft Structures,"—Raytheon, www.defense-update.com, pp. 1-3.

Leaf Spring Retainer Seals; EMP, Inc., 2 pgs.

Morphiing Systems, "Morphing Aerostructures—An Overview," www.crgrp.net/morphingsystems.htm, pp. 1-9; [accessed Aug. 31, 2005].

"Flap (aircraft)", Wikipedia, The Free Encyclopedia, Aug. 3, 2006, 10:18 UTC. Wikimedia Foundation, Inc. Aug. 5, 2006; http://wn.wikipedia.org/index.pho?title=Flap_%28aircraft%29&oldid=67413665>.

"Slats.", Wikipedia, The Free Encyclopedia. Jun. 27, 2006, 12:323 UTC. Wikimedia Foundation, Inc. Aug. 5, 2006; http://wn.wikipedia.org/w/index.php?title=Slats&oldid=60827639>.

Leaf Spring Retainer Seals; EMP, Inc.; 2 pgs.

Morphing Aircraft Structures, "Morphing Aircraft Structures-Raytheon," <<http://www.defense-update.com/products/m/morphing-structures.htm>>, pp. 1-3, [Accessed Aug. 31, 2005].

Morphing Aircraft Structures, "Morphing Aircraft Structures-The Cellular Approach," <http://www.personal.psu.edu/users/d/s/dsr134/mas/Cellular.htm>, Penn State University, pp. 1-3 [Accessed Aug. 31, 2005].

Morphing Systems, "Morphing Aerostructures—An Overview," <http://www.crgrp.net/morphingsystems.htm>, pp. 3-9, [Accessed Aug. 31, 2005].

Rea, J., "Boeing 777 High Lift Control System," Boeing Commercial Airplane Group, IEEE AES System Magazine, Aug. 1993, pp. 15-21.

* cited by examiner

AIRCRAFT CONTROL SURFACE DRIVE SYSTEM AND ASSOCIATED METHODS

CROSS-REFERENCE TO RELATED APPLICATION

This application is a divisional of U.S. application Ser. No. 10/720,786, filed Nov. 24, 2003, which issued Oct. 5, 2004 as U.S. Pat. No. 6,799,739, which is incorporated herein by reference in its entirety.

TECHNICAL FIELD

This disclosure relates generally to drive systems for aircraft control surfaces, and more particularly to hydraulic drive systems for moving and controlling the aircraft control surfaces.

BACKGROUND

All aircraft include movable control surfaces for directional control in flight. Such control surfaces can include ailerons for roll control, elevators for pitch control, and rudders for yaw control. In addition, most conventional jet transport aircraft typically include leading edge slats and trailing edge flaps on the wings. These devices can be used to generate high lift during takeoff and landing when the aircraft is traveling at relatively low air speeds.

Federal aviation regulations (FARs) impose airworthiness standards on lift and drag devices for transport category aircraft. For example, FAR § 25.697 requires that such devices (e.g., trailing edge flaps) must maintain selected positions (e.g., extended positions) without further attention by the pilot. This requirement applies at all times during flight. Thus, lift and drag devices must be able to maintain extended positions even in the unlikely event of a general failure of the aircraft's power system.

Trailing edge flaps ("flaps") on jet transport aircraft typically deploy aft of the wing and downward to increase wing area and camber. The flaps are typically powered by a drive system having a drive shaft that extends longitudinally inside the wing and is coupled to a central power drive unit. The drive shaft for each wing is connected by a system of gears to a series of ball screws and linear actuators distributed along the length of the wing adjacent to the flaps. Rotation of the drive shaft in a first direction causes the ball screws to rotate in a corresponding direction, thereby extending the flaps on the wing. Similarly, counter rotation of the drive shaft causes the ball screws to counter-rotate, thereby retracting the flaps. Flap drive systems are mechanically interconnected to provide wing-to-wing symmetry of the trailing edge flaps on both wings. Such wing-to-wing symmetry, or equivalent, is required by the current FARs. These conventional drive systems, however, can be very heavy and costly.

Hydraulic drive systems with linear actuators have also been used for flap drive systems. For safety purposes, these hydraulic flap drive systems are typically designed to include built-in backup or redundant systems. Accordingly, the hydraulic flap drive systems are powered by two hydraulic systems and utilize twice as many linear actuators as are required to handle the system loads. The resulting hydraulic flap drive systems tend to weigh more and cost more than the drive systems using the drive shafts and gears.

SUMMARY

Aspects of embodiments of the invention are directed to drive systems for aircraft control surfaces, such as trailing edge flaps and leading edge slats. One embodiment provides an actuator control system for controlling first and second control portions. The system comprises first and second supply lines and a return line coupleable to a source of fluid. A fluid-driven actuator is connected to at least one of the first and second control portions. The fluid-driven actuator is in fluid communication with the first and second supply lines. A flow control assembly is connected to the first supply line and to the return line. The flow control is configured to control the flow of fluid in one direction from the first supply line to the fluid-driven actuators and to control the flow of fluid in another direction from the fluid-driven actuator to the return line. A bypass line is in fluid communication with the first and second supply lines and is positioned to provide fluid from the second supply line into the first supply line at a position intermediate the source and the fluid-driven actuator.

Another embodiment provides an aircraft system having first and second control surfaces, a source of hydraulic fluid, a first control system coupled to the first control surface, and a second control system coupled to the second control surface. Each of the first and second control systems comprises first and second supply lines coupled to the source of hydraulic fluid, and a return line coupled to the source of hydraulic fluid. A hydraulic actuator is connected to at least one of the first and second aircraft control surfaces. The hydraulic actuator is movable between first and second positions, and is configured to receive hydraulic fluid from the first supply line when the hydraulic actuator moves toward the first position. The hydraulic actuator is also configured to receive hydraulic fluid from the second supply line when the hydraulic actuator moves toward the second position.

A flow-blocking member is coupled to the first and second supply lines and is movable between an open position and a closed position. The flow-blocking member, when in the closed position, prevents movement of the hydraulic fluid to and from the hydraulic actuator. A flow control assembly is connected to the return line and to at least one of the first and second supply lines. A bypass line is in fluid communication with the first and second supply lines. The bypass line is positioned to direct hydraulic fluid from one of the first and second supply lines into the other one of the first and second supply lines upstream of the hydraulic actuator. The bypass line recycles the hydraulic fluid back into the other one of the first and second supply lines when the hydraulic actuator moves toward the first position. A computer controller operatively interconnects the first and second control systems.

Another aspect of the invention includes a method of making a control surface drive system. The method can include connecting first and second supply lines and a return line to a source of fluid, and connecting a plurality of fluid-driven actuator assemblies to the first and second supply lines and to the return line. The method can also include connecting the fluid-driven actuator assemblies to at least one control surface and connecting a flow control assembly to the return line and to at least one of the first and second supply lines. The method can also include connecting a bypass line to the first and second supply lines in a position to direct fluid from one of the first and second supply lines into the other one of the first and second supply lines at a position intermediate the source of fluid and at least one of the fluid-driven actuators when the at least one of the fluid-driven actuators moves toward the first position to recycle the fluid back into the other one of the first and second supply lines.

DETAILED DESCRIPTION

The following disclosure describes drive systems for use with aircraft trailing edge flaps and other aircraft control surfaces. Certain specific details are set forth in the following description and in FIGS. 1-4 to provide a thorough understanding of various embodiments of the invention. Other details describing the well-known structures and systems often associated with aircraft, and more specifically with aircraft control surface drive systems, are-not set forth in the following description to avoid unnecessarily obscuring the description of the various embodiments of the invention.

Many of the details, dimensions, and other specifications shown in the Figures are merely illustrative of particular embodiments of the invention. Accordingly, other embodiments can have other details, dimensions, and specifications without departing from the spirit or scope of the present invention. In addition, other embodiments of the invention may be practiced without several of the details described below.

Figure 1:
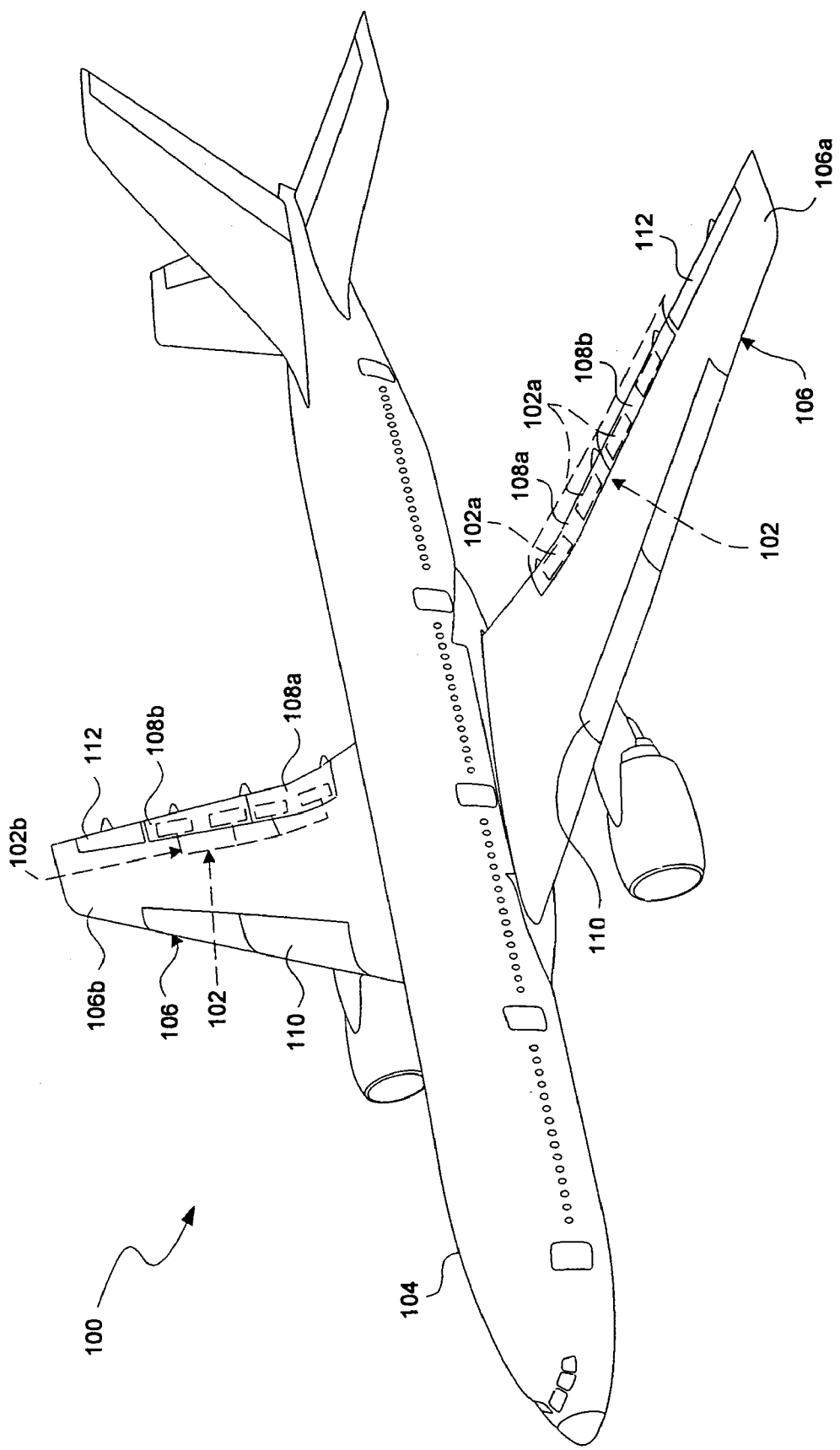
FIG. 1 is a partially schematic, top isometric view of an aircraft having a control surface drive system configured in accordance with an embodiment of the invention.

FIG. 1 is a partially schematic, top isometric view of an aircraft 100 having a control surface drive system 102 configured in accordance with an embodiment of the invention. In one aspect of this embodiment, the aircraft 100 includes a fuselage 104 and wings 106 (shown as first and second wings 106a and 106b) fixedly attached to the fuselage. Each wing 106 can include a number of movable control surfaces for controlling the aircraft 100 during flight. These control surfaces can include trailing edge flaps 108, leading edge slats 110, and ailerons 112. The trailing edge flaps 108, which are shown as an inboard flap 108a and an outboard flap 108b, are used for generating increased lift during takeoff and landing of the aircraft 100.

In operation, the control surface drive system 102 can move the flaps 108 between a retracted position (shown by solid lines) and an extended position (shown by dashed lines). In the extended position, aerodynamic forces on the flaps 108 may be substantial. The control surface drive system 102, in accordance with Federal Aviation Regulations, should be able to hold the flaps 108 in the extended position against the aerodynamic forces without any input by the pilot of the aircraft 100, even in the event of a general power failure. Accordingly, the control surface drive system 102 can be configured to lock the flaps 108 in the extended position, the retracted position, or any intermediate position therebetween against the aerodynamic forces, as discussed in greater detail below. Although the foregoing discussion refers to the flaps 108 for purposes of illustration, the discussion is equally applicable to driving other control surfaces that function in a similar manner and are generally subject to the same functional requirements imposed on the flaps, such as the slats 110.

Figure 2:
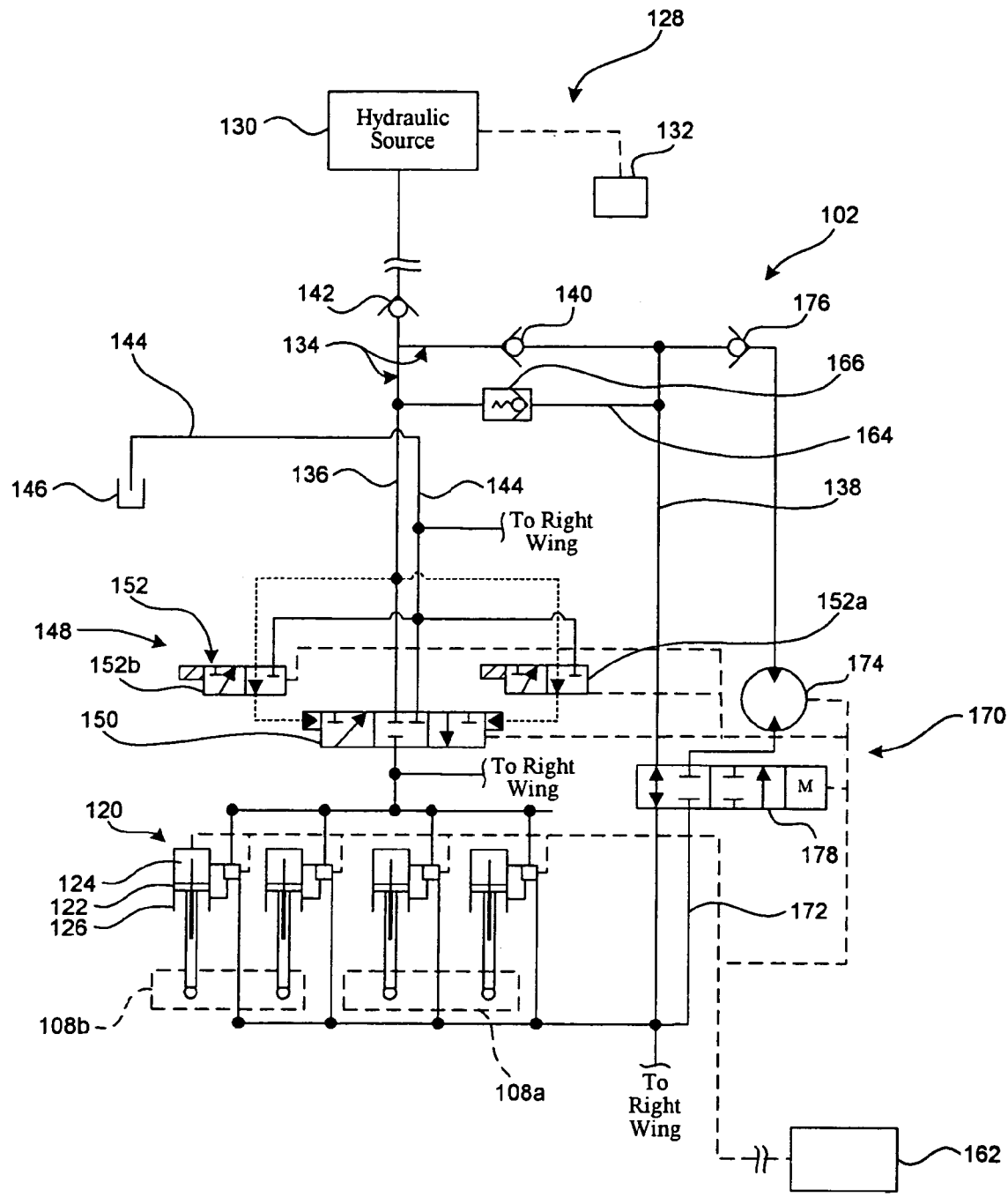
FIG. 2 is a schematic diagram of the control surface drive system of FIG. 1, which includes a plurality of actuator assemblies.

FIG. 2 is a schematic view of the control surface drive system 102 of FIG. 1 configured in accordance with an embodiment of the invention. In one aspect of this embodiment, the control surface drive system 102 ("system 102") includes a plurality of actuator assemblies 120 connected to the flaps 108. In the illustrated embodiment, two actuator assemblies 120 are connected to the inboard flap 108a and two actuator assemblies are connected to the outboard flap 108b of each wing 106 (FIG. 1). The actuator assemblies 120 are extendible and retractable to drive the flaps 108 between the extended and retracted positions in direct response to instructions from the pilot.

The actuator assemblies 120 each include a hydraulic actuator 122 that has a head end 124 and a rod end 126. The hydraulic actuator 122 is configured to receive high pressure hydraulic fluid in the head end 124 or rod end 126 to move the respective actuator assembly 120 between extended and retracted positions. The high-pressure hydraulic fluid is received from the aircraft's primary hydraulic system 128, which also controls a variety of other hydraulically driven systems in the aircraft 100 (FIG. 1). The primary hydraulic system 128 has a hydraulic fluid source 130 and a primary electrical power source 132.

The system 102 has two hydraulic supply lines 134 that connect to each actuator assembly 120. The first supply line is referred to as an extend line 136 because it directs hydraulic fluid to the actuator assemblies 120 for movement of the flap 108 toward the extended position. The extend line 136 is coupled at one end to the hydraulic fluid source 130 and coupled at the other end to the head end 124 of each hydraulic actuator 122. The second supply line is referred to as a retract line 138 because it directs hydraulic fluid to the actuator assemblies 120 for movement of the flap 108 toward the retracted position. The retract line 138 is coupled at one end to the hydraulic fluid source 130 and coupled at the other end to the rod end 1-26 of each hydraulic actuator 122.

In the illustrated embodiment, the system 102 is configured so each hydraulic actuator 122 is normally always pressurized toward the retracted position. A check valve 140 is connected to the retract line 138 to prevent backflow of hydraulic fluid to the hydraulic fluid source 130. Another check valve 142 is connected to the extend line 136 to avoid backflow of the hydraulic fluid toward the hydraulic fluid source 130.

The system 102 also has a hydraulic fluid return line 144 coupled to each actuator assembly 122. In the illustrated embodiment, the return line 144 is coupled at one end to the head end 124 of each hydraulic actuator 122 and is coupled at the other end to a system return 146 in the aircraft's primary hydraulic system 128. The system return 146 is configured to return the hydraulic fluid back to the hydraulic fluid source 130. Accordingly, when the hydraulic actuators 122 are moved toward the retracted position, hydraulic fluid is added to each actuator's rod end 126 and removed from the head end 124. The removed hydraulic fluid is directed into the return line 144 to be recycled through the system return 146 back to the hydraulic fluid source 130.

In the illustrated embodiment, flow of the hydraulic fluid through the system 102 is controlled at least in part by a control valve module 148. The control valve module 148 is connected to the extend line 136 and to the return line 144 to control the flow of hydraulic fluid to and from the head end 124 of each hydraulic actuator 122. The control valve module 148 has a directional control valve 150 connected to the extend line 136 and the return line 144. The directional control valve 150 is adjustable between a plurality of positions to direct hydraulic fluid flow through either the extend line 136 or the return line 144. The directional control valve 150 is also movable to a neutral position that prevents the hydraulic fluid from flowing through both of the extend and return lines 136 and 144, respectively. Accordingly, when the directional control valve 150 is in this neutral position, the hydraulic actuators 122 and the flaps 108 are securely held in a fixed position and resist the air loads exerted on the flaps.

The control valve module 148 of the illustrated embodiment also includes a pair of solenoids 152 coupled to the extend and return lines 136 and 144, respectively, and operatively connected to the directional control valve 150. The solenoids 152 can be activated to facilitate the flow of hydraulic fluid through the directional control valve 150 for the desired movement of the hydraulic actuators 122 toward either the extended or retracted positions. While the illustrated embodiment utilizes a directional control valve 150 and solenoids 152 in the control valve module 148, other valving configurations can be used in alternate embodiments to control the flow of the hydraulic fluid to and from the actuator assemblies 120.

Figure 3:
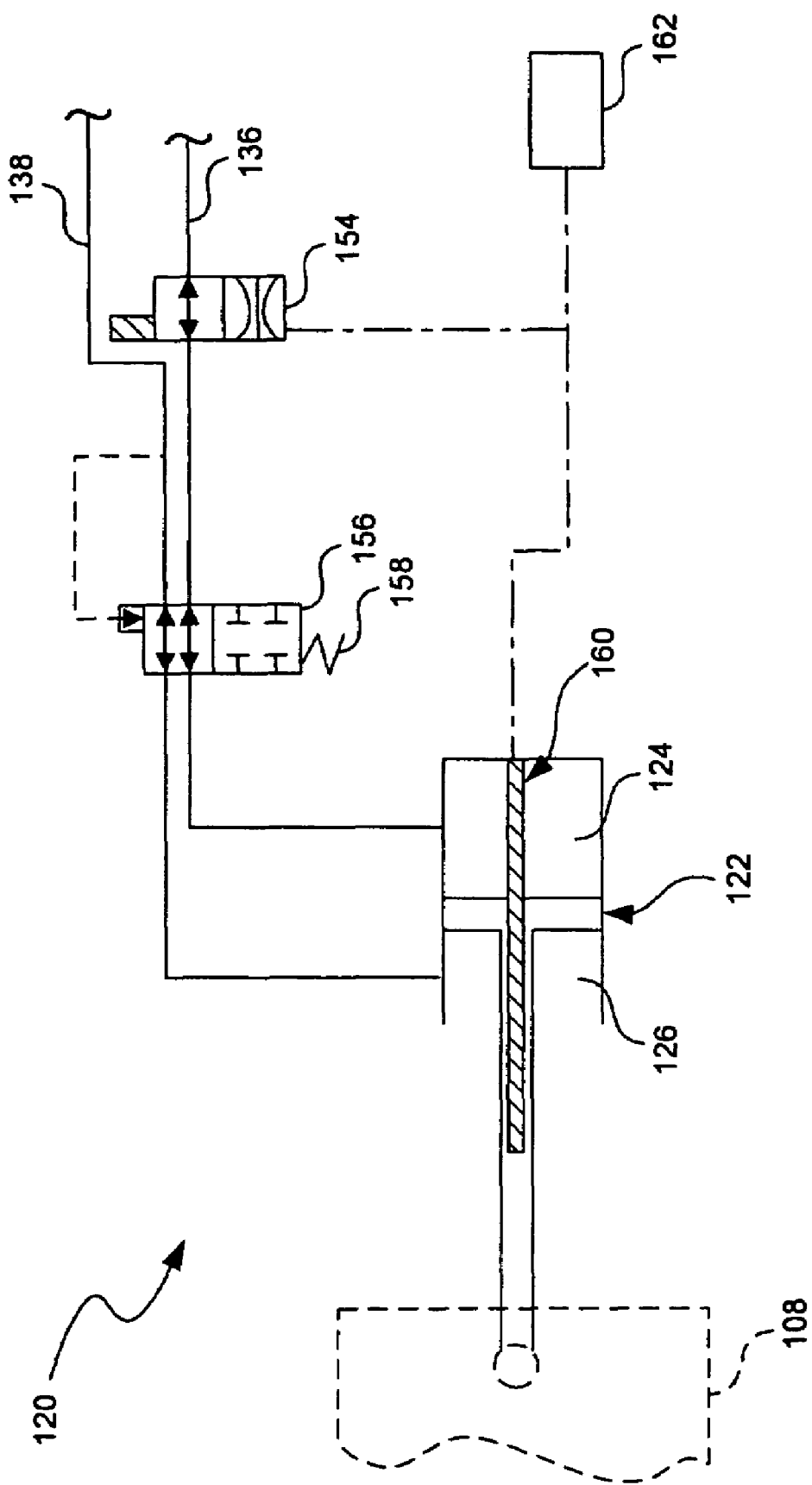
FIG. 3 is an enlarged schematic view of one of the actuator assemblies of FIG. 2.

FIG. 3 is an enlarged schematic view of one of the actuator assemblies 120 in the system 102 of FIG. 2. The illustrated actuator assembly 120 is representative of all of the actuator assemblies in the system 102 of the embodiment described above. The actuator assembly 120 has a valve mechanism 154 connected to the extend line 136. The valve mechanism 154 is adjustable to control the flow of hydraulic fluid to and from the head end 124 of the hydraulic actuator 122, thereby controlling the position and movement of the hydraulic actuator. The valve mechanism 154 is configured to modulate the flow to the head end 124 of each hydraulic actuator 122 to ensure that the entire system 102 (FIG. 2) and the associated flaps 108 remain synchronized with the slowest-moving hydraulic actuator. Because the air loads on the actuator assemblies 120 during operation of the aircraft 100 (FIG. 1) always tend to retract the hydraulic actuators 122, the valve mechanisms 154 provide additional control of the flow of the hydraulic fluid against the aerodynamic forces exerted on the flaps 108. For example, the valve mechanisms provide a "meter in" flow control for loads that work against the hydraulic actuators 122 and the associated flap 108. During flap extension the valve mechanisms 154 also provide a "meter out" flow control for loads that aid the retracting movement of the hydraulic actuators 122 and the associated flap 108 during flap retraction.

While the illustrated embodiment has the valve mechanism 154 connected to the extend line 136, the valve mechanism can be connected to the retract line 138 in another embodiment. In addition, the valve mechanism 154 of the illustrated embodiment is a servovalve, although other valve mechanisms can be used in alternate embodiments to provide an actuator-position control device within each actuator assembly 120.

The actuator assembly 120 also includes a blocking valve 156 connected to the retract line 138 and to the extend line 136. The blocking valve 156 is movable between an open position and a closed position. In the open position, the blocking valve 156 allows the hydraulic fluid to flow substantially freely through the retract line 138 and the extend line 136 during normal movement of the hydraulic actuator 122. When a certain condition exists in the system 102, such as during a loss of hydraulic pressure, the blocking valve 156 automatically moves to the closed position. In the closed position, the blocking valve 156 blocks all hydraulic fluid flow to and from the hydraulic actuator 122 through both of the extend and retract lines 136 and 138, respectively. When the blocking valve 156 is in the closed position, the hydraulic actuator 122 is locked in place, thereby locking the associated flap 108 in a fixed position until the blocking valve is reopened.

In the illustrated embodiment, the blocking valve 156 is a pressure-sensitive shutoff valve that is spring-biased toward the closed position. If hydraulic pressure drops below a threshold level in the retract line 138, a spring 158 will automatically move the blocking valve 156 to the closed position, thereby locking the hydraulic actuator 122 in a fixed position. Accordingly, the actuator assemblies 120 with the blocking valves 156 provide a safety feature that will hold the associated flap 108 in a last-commanded position in the event of a system malfunction, even in response to the air loads on the flap. Although the illustrated embodiment utilizes a pressure-sensitive shutoff valve for the blocking valve 156, alternate embodiments can use other valving configurations, such as a solenoid-controlled valve or other valving mechanism.

The actuator assembly 120 also includes a position sensor 160 connected to the hydraulic actuator 122. The position sensor 160 is configured to monitor the position and movement of each actuator 122, which allows for indirect monitoring of the position and movement of each flap 108 to which each hydraulic actuator is connected. The position sensor 160 of the illustrated embodiment is a linear transducer, although other sensor devices can be used in alternate embodiments. In other embodiments, a position sensor can be applied to a flap 108, which allows for indirect monitoring of the position and movement of the hydraulic actuator between the extended and retracted positions.

In the illustrated embodiment, each position sensor 160 is operatively connected to a flight control computer 162 on the aircraft 100 (FIG. 1). The flight control computer 162 monitors and compares the position and movement of each actuator assembly 120 and its associated flap 108 to ensure there is simultaneous and uniform movement of the flaps in response to a pilot's command. The flight control computer 162 is also operatively connected to the valve mechanism 154 in each actuator assembly 120. The flight control computer 162 effectively modulates all of the valve mechanisms 154 to control synchronized movement of the actuator assemblies 120 and flaps 108.

Referring back to FIG. 2, the flight control computer 162 is also operatively connected to the control valve module 148, and is configured to monitor and adjust the directional control valve 150 and the solenoids 152. Accordingly, the flight control computer 162 controls the flow of hydraulic fluid to and from the head end 124 of the hydraulic actuators 122, thereby controlling movement of the flaps 108 between the extended and retracted positions. When the actuator assemblies 120 have moved the flaps 108 to the correct position in response to a pilot's command, the flight control computer 162 can switch the directional control valve 150 to the neutral position and lock the actuator assemblies 120 in the commanded position. In addition, if the flight control computer 162 determines that the movement of the actuator assemblies 120 is not uniform or is abnormal, the flight control computer can activate the control valve module 148 to lock the actuator assemblies and flaps 108 in a fixed or last-commanded position. Therefore, the control valve module 148, when in the neutral position, provides a backup blocking system to lock the actuator assemblies 120 and the flaps 108 in a fixed position, either in response to normal flight commands or in response to an abnormal condition.

Referring again to FIG. 2, when the actuator assemblies 120 and flaps 108 are to be moved toward the retracted position, the control valve module 148 receives a signal from the flight control computer 162 to activate the retract solenoid 152a. The retract solenoid 152a moves the directional control valve 150 to the retract position. High-pressure hydraulic fluid is directed through the retract line 138 and is added into the rod end 126 of each hydraulic actuator 122. In the illustrated embodiment, actuator retraction is effected by simply coupling the head end 124 of the hydraulic actuator 122 to the system return 146 via the return line 144. Accordingly, the head end 124 of each hydraulic actuator 122 is substantially unpressurized. The high-pressure hydraulic fluid at the rod end 126 of the hydraulic actuator 122 will cause the actuator assembly 120 to move toward the retracted position. As the hydraulic fluid is added into the rod end 126, hydraulic fluid is forced out of the head end 124. As the hydraulic fluid flows from the head end 124, the directional control valve 150 directs the hydraulic fluid flow into the return line 144 and back toward the system return 146.

When the flaps 108 are to remain stationary in a position commanded by the pilot, the directional control valve 150 in the control valve module 148 remains in the neutral position. If an unintended positional change occurs to any of the actuator assemblies 120, the flight control computer 162 activates the control surface drive system 102 to lock the hydraulic actuators 122 and the flaps 108 in the last-commanded position. The flight control computer 162 then provides a signal to the pilot annunciating the status of the flap configuration. Under current Federal Aviation Regulations, flap panel skews due to air loads are considered acceptable if annunciated to the pilot.

To extend the actuator assemblies 120 toward the extended position, the flight control computer 162 activates the extend solenoid 152b and the directional control valve 150 is moved to the extend position. Movement of the hydraulic actuator 122 against an opposing load toward the extended position is caused by the pressure applied to the differential area between the head end 124 and the rod end 126 in the actuator 122. Accordingly, high-pressure hydraulic fluid is ported from the extend line 136 into the head end 124 of each hydraulic actuator 122. The flight control computer modulates actuator extension by controlling the pressurized hydraulic fluid to the head end 124 of the hydraulic actuator 122. As the hydraulic fluid moves into the head end 124 and the actuators 122 move toward the extended position, hydraulic fluid is forced out of the rod end 126 back along the retract line 138.

In the illustrated embodiment, a bypass line 164 is coupled at one end to the retract line 138 and at the other end to the extend line 136. The bypass line 164 is connected to a one-way check valve 166 that allows the hydraulic fluid to flow through the bypass line in only one direction, namely toward the extend line 136. In the illustrated embodiment, the check valve 166 is a pressure-relief check valve, although other valve mechanisms can be used in alternate embodiments.

When the hydraulic actuators 122 are moved toward the extended position, the hydraulic fluid from the rod end 126 moves back along the retract line 138 and into the bypass line 164. The check valve 140 in the retract line 138 is positioned to allow the backflow of hydraulic fluid into the bypass line 164, but the check valve prevents further backflow through the retract line toward the hydraulic fluid source 130. In the illustrated embodiment, the check valve 142 is also provided in the supply lines 134 at a position upstream of the bypass line 164 to avoid backflow or back driving of hydraulic fluid to the hydraulic source 130.

The bypass line 164 directs the hydraulic fluid from the retract line 138 back into the extend line 136, which carries the hydraulic fluid toward the head end 124 of the hydraulic actuator 122. Accordingly, the bypass line 164 provides a bypass or "run around" circuit that allows local recycling of the hydraulic fluid volume for use by the actuator assemblies 120. The system 102 does not provide a significant demand on the aircraft's primary hydraulic system 128, and the primary hydraulic system only needs to provide enough hydraulic fluid to make up the difference between the volume in the head end 124 and the volume in the rod end 126 of the actuator assemblies 120. Therefore, the system 102 requires a minimum amount of hydraulic fluid from the hydraulic fluid source 130, which provides for a significant weight and cost savings for the aircraft 100 (FIG. 1).

The control surface drive system 102 illustrated in FIG. 2 also includes a dedicated alternate mode power system 170 that can be used to temporarily operate the actuator assemblies 120 in the event that the primary hydraulic source 130 or power source 132 is unavailable. Accordingly, the power system 170 provides a dedicated backup power system within each control surface drive system 102 to drive the actuator assemblies 120 and the flaps 108. In the illustrated embodiment, the power system 170 includes a hydraulic line 172 that defines a backup circuit connected to the retract line 138.

A pump 174 is connected to the hydraulic line 172 and is operatively connected to the flight control computer 162. The pump 174 can be activated to pressurize and pump hydraulic fluid for operation of all actuator assemblies 120 in the system 102. In the illustrated embodiment, the pump 174 is a self-contained, AC motor pump, although other dedicated pump mechanisms could be used in alternate embodiments.

The alternate mode power system 170 also includes a check valve 176 connected to the hydraulic line 172 on one side of the pump 174, and a valve assembly 178 connected to the hydraulic line 172 on the other side of the pump 174. In the illustrated embodiment, the valve assembly 178 is a motor-operated shutoff valve operatively connected to the flight control computer 162. The valve assembly 178 is movable between a normal, blocked mode and an activated mode. In the normal, blocked mode, the power system 170 is not activated and the valve assembly 178 blocks the hydraulic fluid from flowing through the hydraulic line 172. In the activated mode, the valve assembly 178 is switched to allow the pump 174 to pump hydraulic fluid through the hydraulic line 172 to operate the actuator assemblies 120.

The power system 170 of the illustrated embodiment provides enough hydraulic power so the actuator assemblies 120 can be moved to position and retain the flaps 108 in a suitable landing configuration. The power system 170 can be configured in another embodiment to allow for full flap extension. In other alternate embodiments, the dedicated power system 170, can be configured for less than full movement of the actuator assemblies 120, provided that the power system meets the requirements of pilot procedures or federal aviation regulations.

Figure 4:
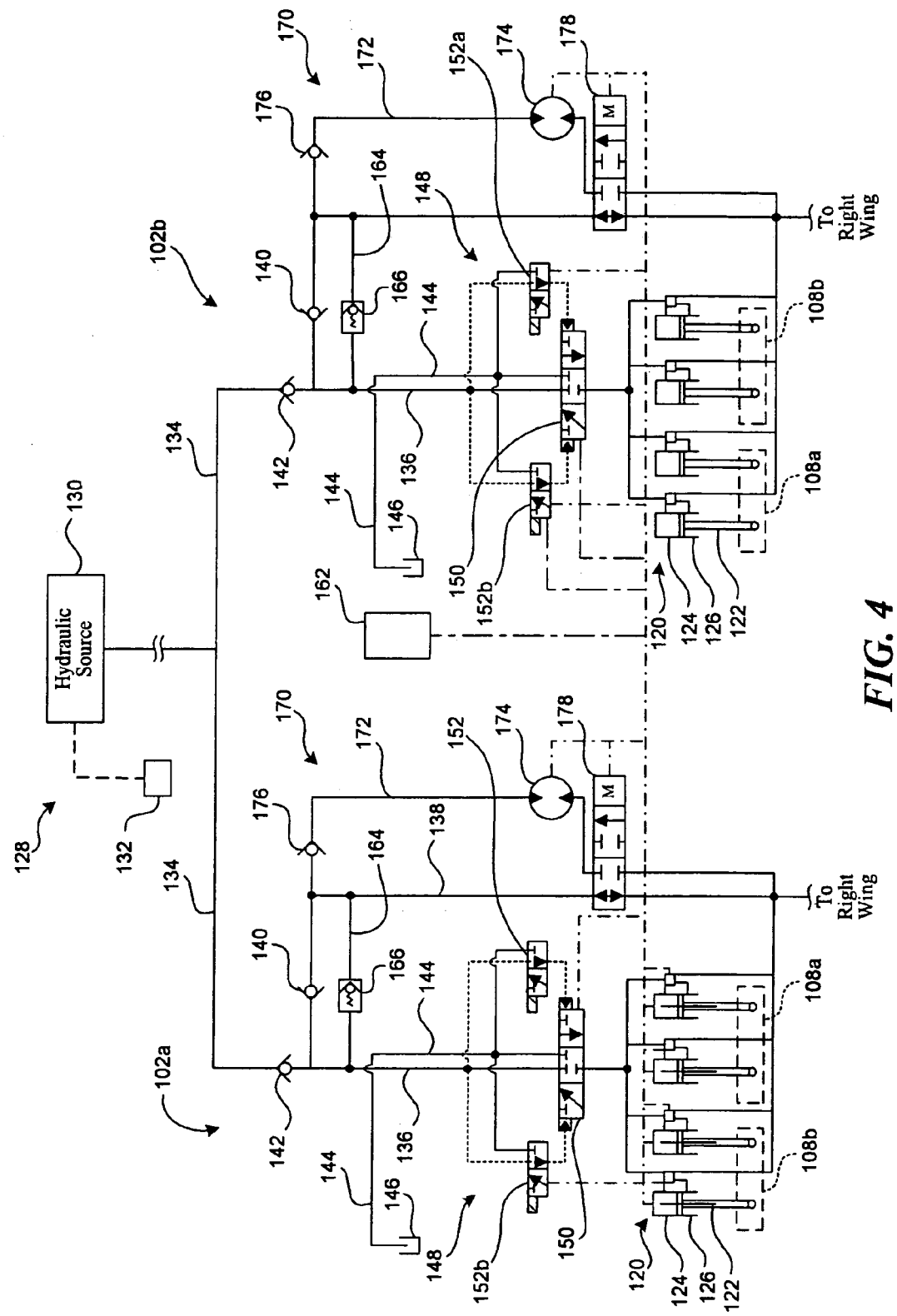
FIG. 4 is a schematic view of another embodiment having a plurality of control surface drive systems shown coupled to a hydraulic fluid source and a common flight control computer.

FIG. 4 is a schematic view of an arrangement in accordance with another embodiment having a plurality of the control surface drive systems 102. In this alternate embodiment, the system 102 has a left-side control surface drive system 102a ("left system 102a") and a right-side control surface drive system 102b ("right system 102b"). Each of the left and right systems 102a and 102b is operatively connected to the aircraft's primary hydraulic system 128. The left system 102a is connected to the aircraft's left wing 106a (FIG. 1) and has four actuator assemblies 120. Two of the actuator assemblies 120 are connected to the left inboard flap 108a, and the other two actuator assemblies are connected to the left outboard flap 108b.

The right system 102b is connected to the aircraft's right wing 106b (FIG. 1) and also has four actuator assemblies 120, two connected to the right inboard flap 108a and two connected to the right outboard flap 108b. The configuration and operation of each of the left and right systems 102a and 102b is substantially identical to the system 102 described above with reference to FIG. 2. In the illustrated embodiment, the left system 102a includes a control module 148 to service the left wing, and the right system 102b includes a different control module that services the right wing. In another embodiment, the left and right systems 102a and 102b can be connected to a single control module 148 that services both wings. In the illustrated embodiment, each of the left and right systems 102a and 102b provides a bypass circuit with the bypass line 164 and check valve 166, as discussed above. Each of the left and right systems 102a and 102b also have a dedicated alternate-mode power system 170 for operation of the actuator assemblies 120 and the flaps 108 during operation of the aircraft 100 (FIG. 1).

Each of the left and right systems 102a and 102b are operatively connected to the single flight control computer 162. The flight control computer 162 simultaneously monitors and controls both of the left and right systems 102a and 102b. Accordingly, the flight control computer 162 ensures simultaneous and consistent operation of the flaps 108 on both left and right wings 106a and 106b during normal operation. The flight control computer 162 also provides the equivalent of a mechanical interconnection between the left and right systems 102a and 102b, respectively, to provide wing-to-wing symmetry of the flaps 108 during operation of the aircraft 100 (FIG. 1).

In another embodiment, a single control surface drive system 102 substantially identical to the system described above can have eight actuator assemblies 120, four of which are on each wing 106. This single system 102 with the eight actuator assemblies 120 could be configured to simultaneously control the flaps on both wings 106. In other alternate embodiments, a separate dedicated control surface drive system 102 could be provided to control each flap or other selected control surfaces. Accordingly, an aircraft 100 (FIG. 1) with four flaps would have four separate control surface drive systems 102. In this alternate embodiment, each control surface drive system 102 is operatively connected to, and controlled by, the flight control computer 158.

From the foregoing, it will be appreciated that specific embodiments of the invention have been described herein for purposes of illustration, but that various modifications may be made without deviating from the spirit and scope of the invention. As an example, one embodiment provides an actuator control system having actuator assemblies 120 with pneumatic actuators or other fluid-driven actuators coupled to a pressurized fluid system to drive and control the fluid-driven actuators. Accordingly, the invention is not limited except as by the appended claims.

I claim:

1. An actuator control system for an aircraft, comprising:
first and second aircraft control portions;
a source of fluid on the aircraft;
first and second supply lines and a return line coupleable to the source of fluid;
a fluid-driven actuator connected to at least one of the first and second control portions, the fluid-driven actuator in fluid communication with the first and second supply lines;
a flow control assembly connected to the first supply line and to the return line and configured to control the flow of fluid in one direction from the first supply line to the fluid-driven actuators and to control the flow of fluid in another direction from the fluid-driven actuator to the return line;
a bypass line connected to the first and second supply lines and positioned to provide fluid from the second supply line into the first supply line at a position intermediate the source and the flow control assembly, the bypass line being configured to allow local recycling of the fluid from the second supply line to the first supply line at the position intermediate the source and the flow control assembly to drive the actuator;
a primary power system operatively coupled to the fluid-driven actuator; and
a dedicated alternate power system coupled to the fluid-driven actuator with the alternate power system being provided for dedicated operation of the fluid-driven actuator.

2. The system of claim 1, further comprising a flow controller connected to the first and second supply lines and being movable from a first position that allows movement of the fluid-driven actuator and a second position that restricts movement of the fluid-driven actuator.

3. The system of claim 2 wherein flow controller is a blocking valve and the first position is an open position and the second position is a closed position.

4. The system of claim 1 wherein the fluid-driven actuator is a hydraulic actuator.

5. The system of claim 1, further comprising a power system having a fluid line connected to at least one of the first and second supply lines, and a pump connected to the fluid line and configured to pump fluid to the fluid-driven actuator.

6. The system of claim 1 wherein the fluid-driven actuator is movable between extended and retracted positions, the first supply line being configured to provide the fluid to move the fluid-driven actuator toward the extended position and the second supply line being configured to provide the fluid to move the fluid-driven actuator toward the retracted position.

7. The system of claim 1 wherein the flow control assembly includes a valve movable between a first position that controls a flow of fluid through the first supply line, a second position that controls a flow of fluid through the return line, and a third position that restricts flow through the first supply line and through the return line.

\* \* \* \* \*